United States Patent
Howes et al.

(10) Patent No.: US 10,837,654 B2
(45) Date of Patent: Nov. 17, 2020

(54) USER INTERFACE FOR THERMOSTAT AND RELATED DEVICES, SYSTEMS, AND METHODS

(71) Applicant: Schneider Electric Controls UK Limited, Plymouth (GB)

(72) Inventors: Ryan Howes, Plymouth (GB); David Kempster, Torpoint (GB); Mikael Eliaeson, Exeter (GB); Samuel Riley, Saltash (GB); James E. Parker, Plymouth (GB); John Kent, Lostwithiel (GB)

(73) Assignee: Schneider Electric Controls UK Limited, Shropshire (GB)

( * ) Notice: Subject to any disclaimer, the term of this patent is extended or adjusted under 35 U.S.C. 154(b) by 353 days.

(21) Appl. No.: 15/807,750

(22) Filed: Nov. 9, 2017

(65) Prior Publication Data
US 2018/0128500 A1 May 10, 2018

Related U.S. Application Data

(60) Provisional application No. 62/419,673, filed on Nov. 9, 2016.

(51) Int. Cl.
*F24D 19/10* (2006.01)
*G05D 23/19* (2006.01)
(Continued)

(52) U.S. Cl.
CPC .......... *F24D 19/1018* (2013.01); *F24D 3/02* (2013.01); *F24D 19/0073* (2013.01);
(Continued)

(58) Field of Classification Search
CPC .... F24D 19/1018; F24D 19/0073; F24D 3/02; F24D 2220/003; F24D 2220/0257;
(Continued)

(56) References Cited

U.S. PATENT DOCUMENTS

| 2,344,991 A | 3/1944 | Lilja |
| 3,134,542 A | 5/1964 | Smith |

(Continued)

FOREIGN PATENT DOCUMENTS

| DE | 3643434 A1 | 6/1988 |
| DE | 102011018698 A1 | 10/2012 |

(Continued)

OTHER PUBLICATIONS

European Search Report for application No. EP17200551.4 dated Jul. 6, 2018, 11 pgs.

(Continued)

*Primary Examiner* — Steven B McAllister
*Assistant Examiner* — Daniel E. Namay
(74) *Attorney, Agent, or Firm* — Stinson LLP (57) ABSTRACT

A user interface for a thermostat that controls a radiator valve can include a user input member that is movable from a home position to a set point increase or decrease position to increase or decrease a set point temperature of the thermostat. In some embodiments, a return mechanism returns the user input member to the home position after being released from one of the set point increase and decrease positions. The user interface can include an indicator panel and controller that controls the indicator panel to provide an indication of when the set point temperature of the thermostat is being adjusted. The user interface can also include a lockout controller that prevents further set point temperature adjustments using the user interface when the set point temperature differs from the environmental temperature by a specified amount.

6 Claims, 7 Drawing Sheets

(51) Int. Cl.
*F24D 19/00* (2006.01)
*F24D 3/02* (2006.01)

(52) U.S. Cl.
CPC ..... *G05D 23/1902* (2013.01); *G05D 23/1917* (2013.01); *F24D 2220/003* (2013.01)

(58) Field of Classification Search
CPC .......... F24D 2220/042; G05D 23/1902; G05D 23/1917; G05D 23/2039; G01K 13/08
USPC ................................................ 237/8 A, 2 A
See application file for complete search history.

(56) References Cited

U.S. PATENT DOCUMENTS

| | | | |
|---|---|---|---|
| 8,630,741 B1* | 1/2014 | Matsuoka | H04L 12/2829 700/276 |
| 8,659,302 B1* | 2/2014 | Warren | G05D 23/19 324/550 |
| 8,935,110 B2 | 1/2015 | Hsieh et al. | |
| 9,568,201 B2* | 2/2017 | Fadell | G05D 23/1905 |
| 9,791,839 B2 | 10/2017 | Matsuoka et al. | |
| 9,791,871 B1* | 10/2017 | Marschalkowski | G05D 23/1902 |
| 2002/0119003 A1* | 8/2002 | Buschatz | F24D 19/1018 403/376 |
| 2006/0279238 A1 | 12/2006 | Lendi et al. | |
| 2007/0158442 A1 | 7/2007 | Chapman | |
| 2008/0068354 A1 | 3/2008 | Aimi et al. | |
| 2010/0045440 A1 | 2/2010 | Araiza | |
| 2010/0045470 A1 | 2/2010 | Araiza et al. | |
| 2010/0258194 A1 | 10/2010 | Kim | |
| 2010/0270385 A1 | 10/2010 | Kim | |
| 2011/0233290 A1 | 9/2011 | Borovinov | |
| 2012/0130547 A1* | 5/2012 | Fadell | G05B 15/02 700/276 |
| 2012/0203379 A1* | 8/2012 | Sloo | G05D 23/1917 700/276 |
| 2012/0310373 A1 | 12/2012 | Karaffa et al. | |
| 2013/0025301 A1 | 1/2013 | Maitani et al. | |
| 2013/0048745 A1 | 2/2013 | Johnson, Jr. et al. | |
| 2013/0056543 A1 | 3/2013 | Olivotti et al. | |
| 2013/0081799 A1 | 4/2013 | Loblich et al. | |
| 2013/0099009 A1* | 4/2013 | Filson | G05D 23/275 236/1 C |
| 2013/0204440 A1 | 8/2013 | Fadell et al. | |
| 2013/0204442 A1 | 8/2013 | Modi et al. | |
| 2013/0218351 A1* | 8/2013 | Warren | F24F 11/62 700/278 |
| 2013/0221117 A1* | 8/2013 | Warren | F24D 19/1039 236/1 C |
| 2013/0240172 A1 | 9/2013 | Reilly et al. | |
| 2014/0319232 A1 | 10/2014 | Gourlay | |
| 2014/0326796 A1 | 11/2014 | Kymissis et al. | |
| 2015/0102120 A1 | 4/2015 | Sorensen et al. | |
| 2015/0276237 A1* | 10/2015 | Daniels | G01J 5/08 237/2 A |
| 2015/0276238 A1* | 10/2015 | Matsuoka | F24F 11/30 700/278 |
| 2015/0276239 A1* | 10/2015 | Fadell | F24D 19/1009 237/2 A |
| 2017/0059196 A1* | 3/2017 | Stefanski | F24F 11/30 |
| 2017/0060149 A1* | 3/2017 | Giustina | G05D 23/1902 |
| 2017/0060150 A1 | 3/2017 | Stefanski et al. | |
| 2017/0211821 A1 | 7/2017 | Hardesty et al. | |
| 2018/0058705 A1 | 3/2018 | Ha et al. | |
| 2018/0128500 A1 | 5/2018 | Howes et al. | |
| 2018/0128501 A1 | 5/2018 | Howes et al. | |
| 2018/0336775 A1 | 11/2018 | Callemo et al. | |
| 2019/0346153 A1 | 11/2019 | Morita et al. | |
| 2020/0256575 A1 | 8/2020 | Nelson et al. | |

FOREIGN PATENT DOCUMENTS

| | | |
|---|---|---|
| EP | 0282255 A2 | 9/1988 |
| EP | 0282255 A2 | 9/1998 |
| EP | 1156285 A2 | 11/2001 |
| EP | 2114015 A2 | 1/2010 |
| EP | 2144015 A2 | 1/2010 |
| EP | 2857921 A1 | 4/2015 |
| GB | 2161292 A | 1/1986 |
| GB | 2464095 A | 4/2010 |
| GB | 2477860 A | 8/2011 |
| WO | 2009072744 A2 | 6/2009 |
| WO | WO2009072744 A2 | 6/2009 |
| WO | 2012068503 A1 | 5/2012 |
| WO | WO20120685503 A1 | 5/2012 |

OTHER PUBLICATIONS

Partial European Search Report for 17200551.4, dated Apr. 5, 2018.
Extended European Search Report for 17200558.9, dated Jun. 4, 2018.
Extended European Search Report for 17200549.8, dated Mar. 20, 2018.

* cited by examiner

USER INTERFACE FOR THERMOSTAT AND RELATED DEVICES, SYSTEMS, AND METHODS

CROSS REFERENCE TO RELATED APPLICATIONS

This application claims priority to U.S. Provisional Patent Application Ser. No. 62/419,673, filed Nov. 9, 2016 and entitled USER INTERFACE FOR THERMOSTAT AND RELATED DEVICES, SYSTEMS, AND METHODS, which is hereby incorporated by reference in its entirety.

TECHNICAL FIELD

The present disclosure generally relates to a user interface for a thermostat and more specifically to a user interface for an electronic thermostatic radiator valve in a zoned heating system.

BACKGROUND

Thermostats are used to provide temperature feedback control in climate control systems. For example, in a radiant heating system, thermostatic radiator valves are positioned in multiple zones in a building to provide temperature control. Each radiator valve is connected between a boiler and at least one radiator to selectively provide hot water from the boiler to the radiator. The thermostat opens the valve when the environmental temperature in the zone falls below a set point temperature and likewise closes the valve when the environmental temperature exceeds the set point. Certain radiator valves include user interfaces that allow a user to adjust the set point temperature at the radiator valve. User interfaces can include an indicator providing an indication of the detected temperature and an input device that allows the user to select a new set point temperature. While lay users will know whether the environmental temperature in a room suits them (e.g., whether the environmental temperature is too hot or too cold), they may be unable to understand what set point temperature can make them more comfortable in an energy efficient manner. Moreover, radiator valve user interfaces are often near the floor and/or wall and situated in such a way that they are very difficult to read. As a result, when a lay user selects a new set point temperature, it can often be ineffective or inefficient.

SUMMARY

Aspects of the disclosure relate to a user interface for a thermostat configured to control a radiator valve. The user interface can include a user input member that is movable from a home position to a set point increase or decrease position to increase or decrease a set point temperature of the thermostat. The user interface can also include a return mechanism for returning the user input member to the home position after being released from one of the set point increase and decrease positions. The user interface can include an indicator panel and a controller that controls the indicator panel to provide an indication of when the set point temperature of the thermostat is being adjusted. The user interface can also include a lockout controller that prevents set point temperature adjustments in response to inputs to the user interface when the set point temperature differs from the environmental temperature by a specified amount.

In one aspect, a user interface for adjusting a set point temperature of a thermostat configured to thermostatically control a radiator valve to selectively convey heating fluid to a radiator to adjust an environmental temperature toward the set point comprises a base. A user input member is mounted on the base for movement with respect to the base through a range of motion including a home position, a set point decrease position, and a set point increase position. The user input member is operatively connected to the thermostat to decrease the set point temperature when the user input member is moved from the home position to the set point decrease position and to increase the set point temperature when the user input member is moved from the home position to the set point increase position. A return mechanism is operatively connected to the base and the user input member to automatically return the user input member to the home position after it is moved to either of the set point decrease position and the set point increase position and released.

In another aspect, a user interface for adjusting a set point temperature of a thermostat configured to thermostatically control a radiator valve to selectively convey heating fluid to a radiator to adjust an environmental temperature toward the set point temperature comprises a base. A user input member mounted on the base for movement with respect to the base through a range of motion including a home position, a set point decrease position, and a set point increase position. The user input member is operatively connected to the thermostat to decrease the set point temperature when the user input member is moved from the home position to the set point decrease position and to increase the set point temperature when the user input member is moved from the home position to the set point increase position. An indicator light panel is mounted on the base and includes at least a set point decrease light aligned with the set point decrease position of the user input member and a set point increase light aligned with the set point increase position of the user input member. An indicator controller for controlling the indicator light panel is configured to illuminate the set point decrease light when the user interface is used to decrease a set point temperature and to illuminate the set point increase light when the user interface is used to increase the set point temperature.

In yet another aspect, a user interface for adjusting a set point temperature of a thermostat configured to thermostatically control a radiator valve to selectively convey heating fluid to a radiator to adjust an environmental temperature toward the set point temperature comprises a user input mechanism including a base and a user input member that is selectively moveable with respect to the base and is operatively connected to the thermostat to adjust the set point temperature of the thermostat in response to movement of the user input member with respect to the base. A set point lockout controller is configured to determine when the environmental temperature differs from the set point temperature by more than a predetermined maximum offset and to prevent further adjustment to the set point temperature in response to movement of the user input member while the environmental temperature differs from the set point temperature by more than the predetermined maximum offset.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
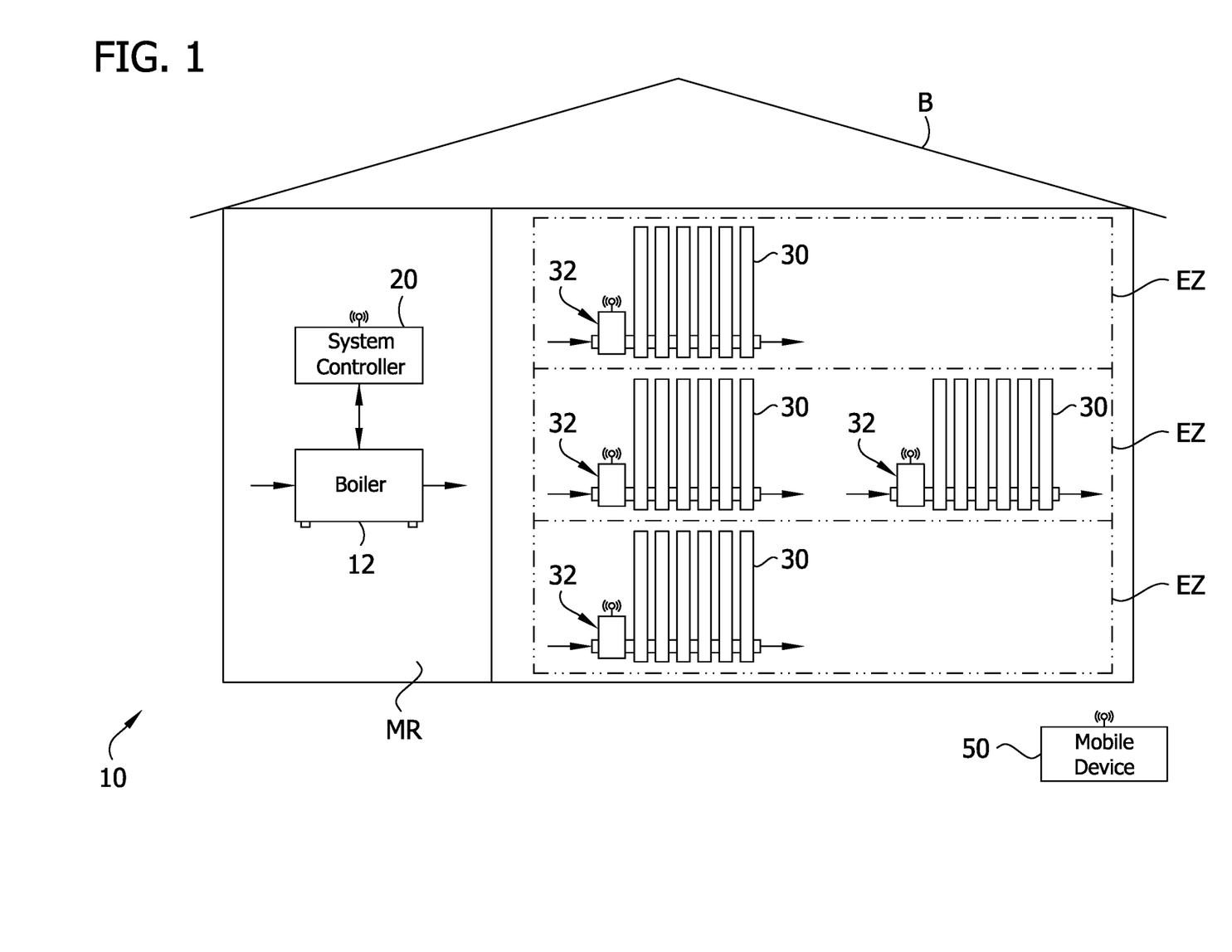
FIG. 1 is a schematic block diagram of a heating system.

Referring to FIG. 1, a zoned radiant heating system is generally indicated at reference number 10. The radiant heating system 10 employs separate thermostats in each of a plurality of environmental zones EZ in a building B. As will be explained below, each thermostat has a user interface that provides intuitive controls for a lay user to make incremental adjustments to the set point temperature for the environmental zone EZ and provides a readily understandable indicator of the status of the thermostat. Although the present disclosure describes the thermostat user interfaces in a zoned radiant heating system 10, it is understood that the user interfaces could also be implemented in other types of environmental control systems. Before describing an exemplary user interface in detail, the present disclosure provides a brief general overview of the radiant heating system 10.

The system 10 includes a boiler 12 that is fluidly connected to a water supply (not shown). In FIG. 1, the flow of water into and out of various components of the system 10, such as the boiler 12, is represented schematically by bold arrows. For clarity, FIG. 1 does not illustrate the interconnecting plumbing for the entire system. But one skilled in the art would readily understand how to interconnect the components of the system 10 through conventional plumbing techniques. The boiler 12 is configured to heat water and to supply hot water (broadly, a heating fluid) to various peripheral components of the system 10. The boiler 12 may be operatively connected to a controller 20 that is configured to control the boiler.

The radiant heating system 10 also includes one or more radiators 30 positioned in each environmental zone EZ for heating the respective environmental zone. In the illustrated embodiment, the building B includes three environmental zones EZ. One environmental zone EZ includes two radiators 30 and the other two environmental zones include one radiator each. It will be understood that the radiant heating system can be used with buildings having other numbers of environmental zones or other numbers of radiators in each zone without departing from the scope of the invention. The radiators 30 are selectively coupled to the boiler 12 to receive the hot water from the boiler. The radiators 30 are configured to convey radiant heat from the hot water to the respective environmental zones EZ.

Each environmental zone EZ includes at least one thermostatic radiator valve 32 configured to control the amount of hot water from the boiler 12 that is supplied to the radiator(s) 30 in the zone. In the illustrated embodiment, each radiator 30 has its own valve 32, but in other embodiments, a single valve can be used to control the flow of hot water to more than one radiator in a respective environmental zone EZ. Each of the illustrated radiator valves 32 is an electronic thermostatic radiator valve.

Figure 2:
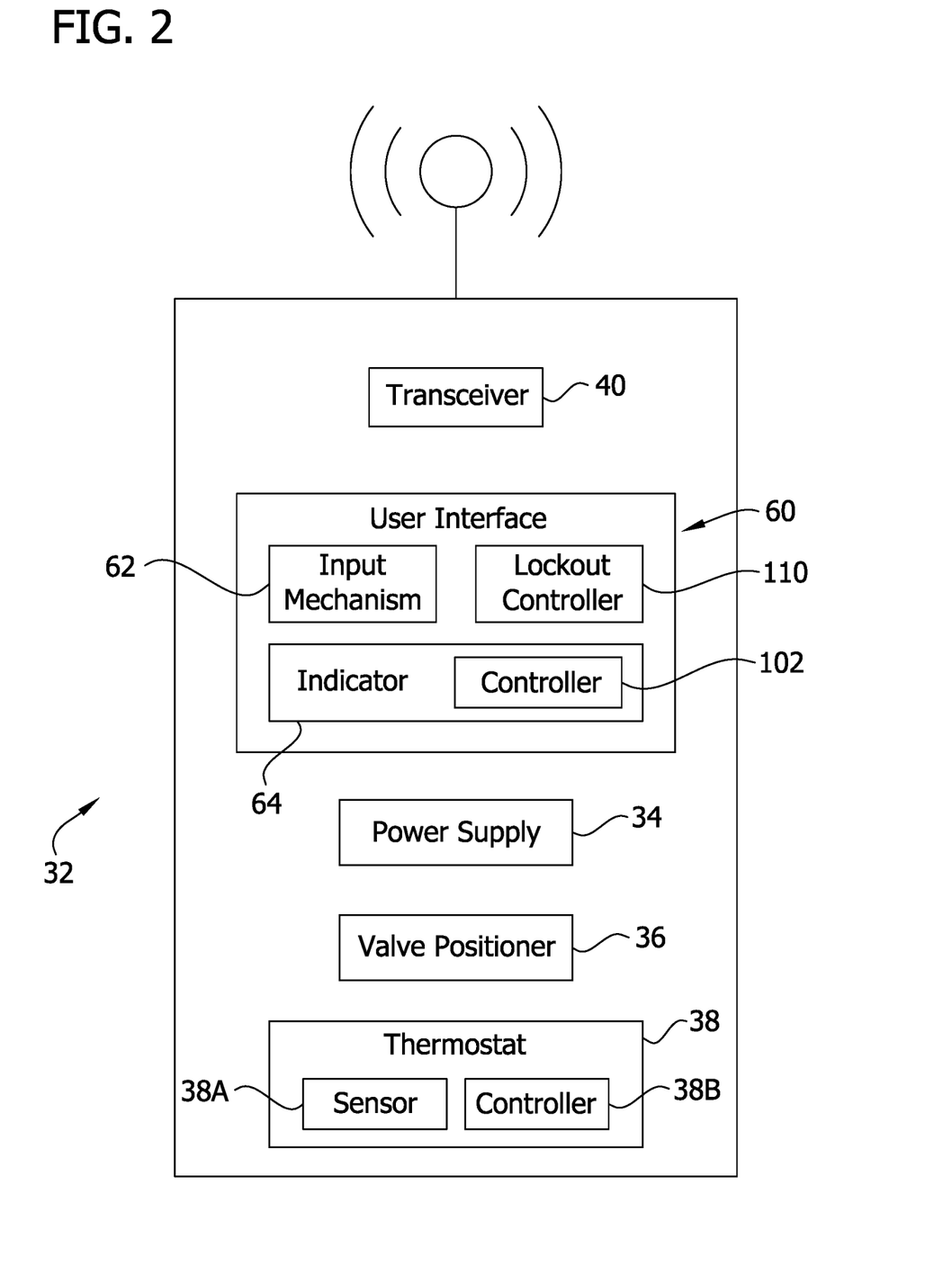
FIG. 2 is a schematic block diagram of an electronic thermostatic radiator valve of the heating system.

Referring to FIG. 2, each radiator valve 32 includes a power supply 34 that is operatively connected to an electronic valve positioner 36. The valve positioner 36 is configured to selectively adjust the position of a valve body to open and close the radiator valve 32. For example, in one embodiment, the valve positioner 36 comprises an electric motor and the power supply 34 comprises a battery. The electric motor 36 draws power from the battery 36, which drives the motor to adjust the position of the valve body to open and close the valve 32. Controlling when and/or the extent to which the radiator valve 32 is opened controls the supply of hot water to the radiator 30 and thus the temperature of the respective environmental zone EZ.

The electronic thermostatic radiator valve 32 is configured to locally maintain the temperature of the respective environmental zone EZ at a set point temperature. The radiator valve 32 includes a thermostat 38 that is configured to sense the temperature of the respective environmental zone EZ at the radiator valve and provide feedback control of the valve positioner 36. The thermostat 38 includes a temperature sensor 38A configured to sense the environmental temperature of the zone and a thermostatic controller 38B configured to provide feedback control of the valve positioner 36 based on the sensed temperature. For example, when the sensor 38A detects a temperature in the environmental zone EZ that is below the set point temperature, the thermostatic controller 38B controls the valve positioner 36 to open the valve 32 and allow more hot water to flow through the radiator 30. When the sensor 38A detects a temperature in the environmental zone EZ that is at or above the set point, the thermostatic controller 38B controls the valve positioner 36 to close the valve 32 and restrict or prevent the flow of additional hot water to the radiator 30. By selectively controlling the flow of hot water from the boiler 12 to the radiator 30, the thermostat 38 can maintain the environmental zone at about a predetermined set point temperature.

Referring to FIG. 1, each electronic thermostatic radiator valve 32 is operatively connected to the central controller 20 to communicate with the controller. In the illustrated embodiment, the controller 20 is located in the mechanical room MR remote from at least some of the radiator valves 32 in the respective environmental zones EZ. To lower the cost of setting up the radiant heating system 10, in certain embodiments, a wireless communications protocol is used to establish a connection between the radiator valves 32 and the controller 20. As shown in FIG. 2, the illustrated radiator valve 32 therefore includes a wireless transceiver 40 for exchanging signals with the controller 20. In a suitable embodiment, the transceiver 40 communicates with the controller 20 using an RF connection, but other types of wireless connections (e.g., Wi-Fi, etc.) or a wired connection can also be used in other embodiments. As explained in further detail below, the controller 20 is configured to transmit control signals to the valves 32 that are operative to adjust the operation of the valves to control the temperatures in the environmental zones. It is understood that, in some embodiments, the valves 32 are also configured to transmit signals to the controller 20 that are used to provide central control of the zoned climate control system 10.

In one or more embodiments, the controller 20 is operatively connected to a user input device 50 to receive user inputs for adjusting the set point temperature of any of the thermostatic radiator valves 32. For example, in the illustrated embodiment, the central controller 20 is an internet connected device and the user input device 50 is a mobile device, such as a phone or a tablet, which communicates with the controller over an internet connection. In other embodiments, the central controller can include a local user interface mounted with the controller in the mechanical room MR or elsewhere in the building B. Suitably, the user input device 50 for the controller 20 includes an indicator (e.g., a display) configured to provide an indication to the user of the value of the set point temperature for each of the thermostats 38 in the system 10. In addition, the user input device 50 is configured to receive user inputs selecting a new set point temperature for any of the thermostats 38. When the user input device 50 receives a user input selecting a new set point temperature, it transmits a user input signal to the controller 20. In response, the controller 20 transmits a set point adjustment control signal to the transceiver 40 of the respective valve 32. The valve 32 receives the set point adjustment control signal and adjusts the set point temperature of the thermostat 38 to the new user-selected set point temperature.

In addition to the centralized set point temperature adjustment capabilities provided by the controller 20, the illustrated heating system 10 is configured to allow a user to make adjustments to the set point temperature of an environmental zone at the respective radiator valve 32. Referring again to FIG. 2, the illustrated radiator valve 32 includes a local user interface, generally indicated at 60. As explained below, the user interface 60 is located at the valve 32 and provides a user input mechanism 62 that presents to the user simplified controls for making incremental adjustments to the set point temperature of the thermostat 38. As further explained below, the user interface 60 includes an indicator 64 that provides a local indication of the status of thermostat 38, including indications of when the thermostat is responding to adjustments that are made to the set point temperature.

Figure 3:
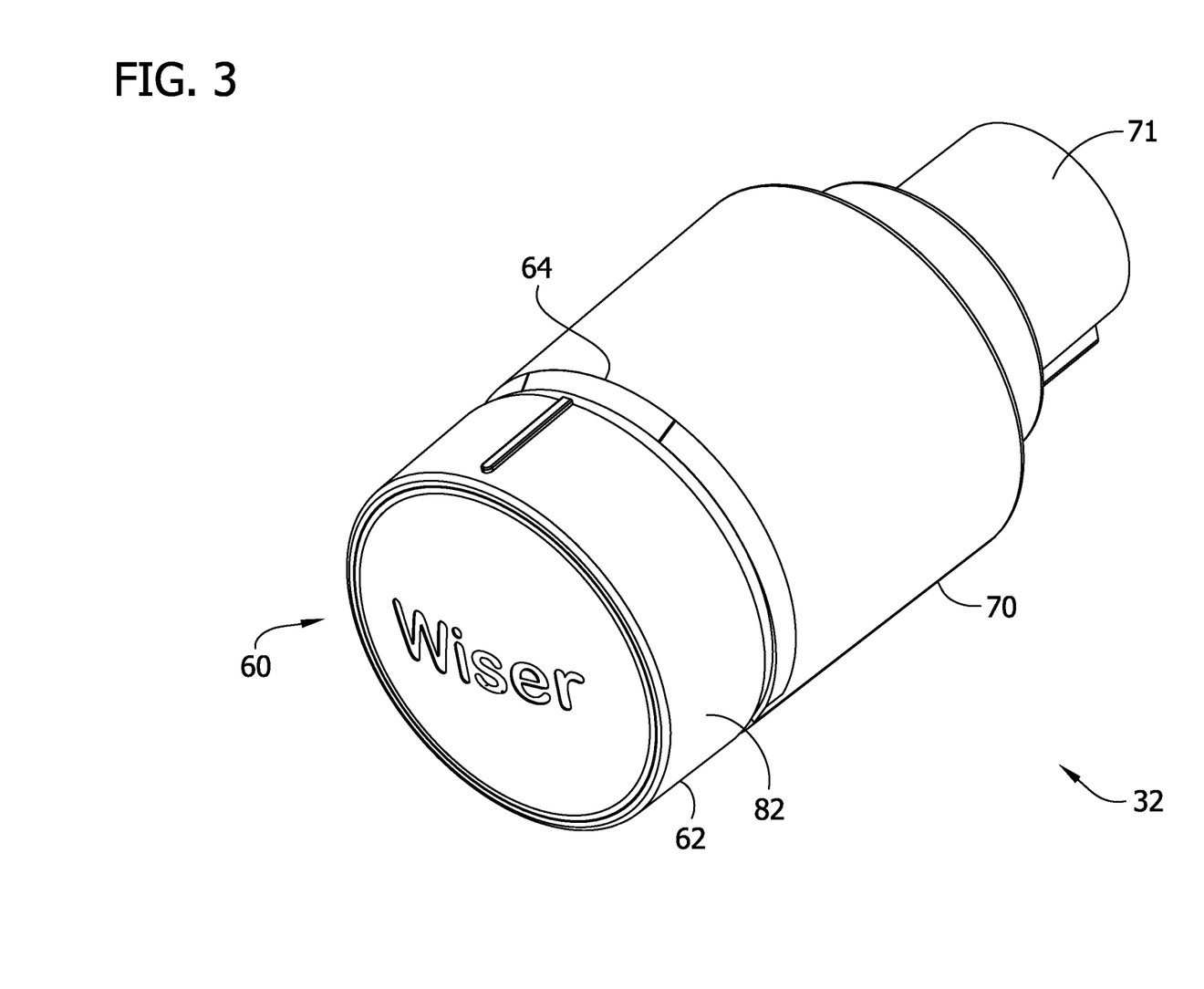
FIG. 3 is a perspective of the electronic thermostatic radiator valve.
Figure 4:
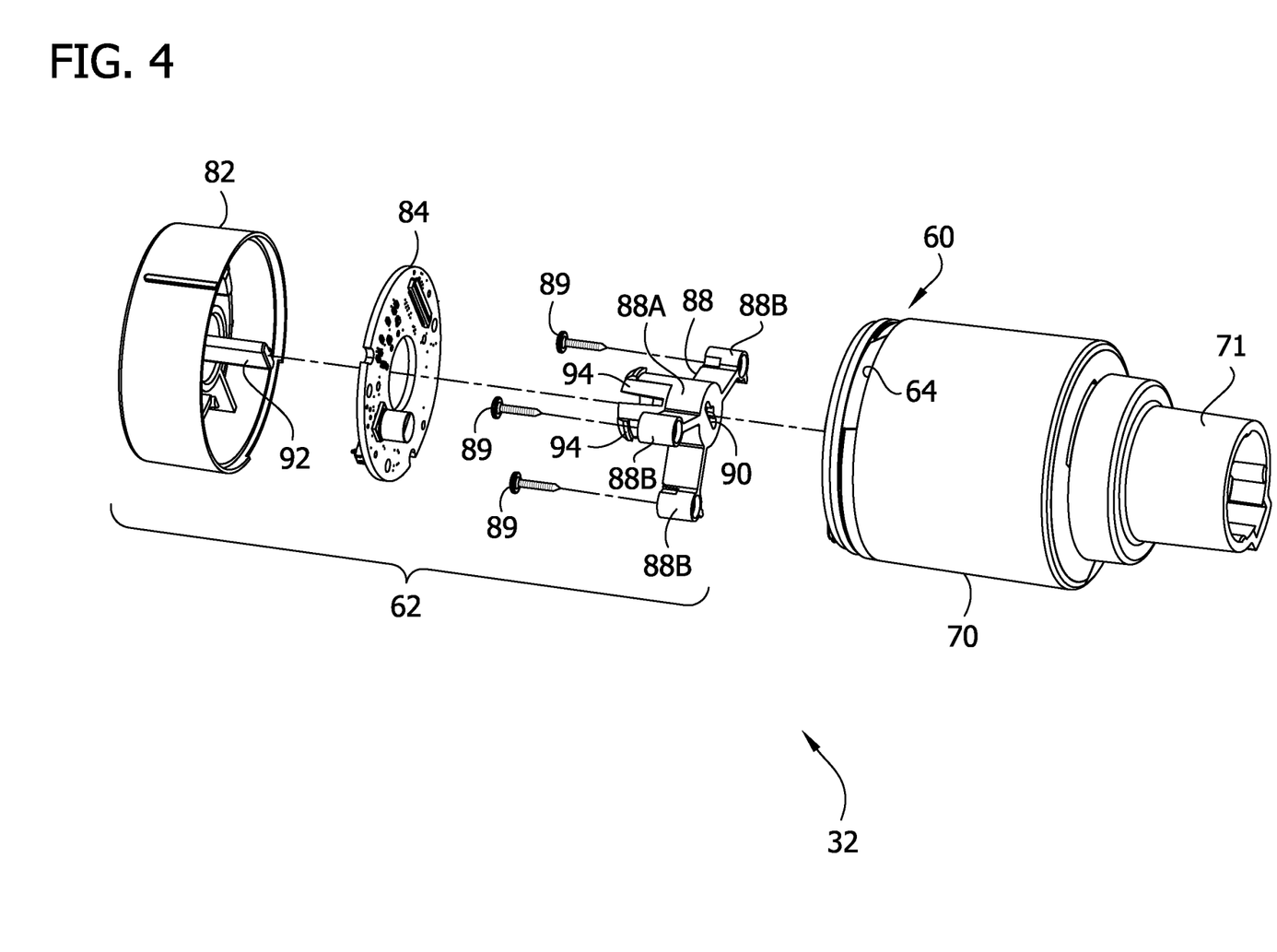
FIG. 4 is another perspective of the electronic thermostatic radiator with a user interface thereof exploded away from a base.

Referring to FIGS. 3 and 4, the user interface 60 for the thermostat 38 is mounted on a base 70. In the illustrated embodiment, the base 70 is generally cylindrical and includes an end fitting 71 configured to operatively connect the valve positioner 36 to the hot water plumbing adjacent and upstream of the respective radiator 30. Suitably, the base 70 defines an interior chamber sized and arranged to receive the batteries 34 for powering the valve positioner 36 therein. In certain embodiments, the base 70 includes a removable access panel (not shown) for selectively accessing the enclosure to remove and replace the batteries 34. The base can have other shapes, sizes, and features in other embodiments.

Figure 3A:
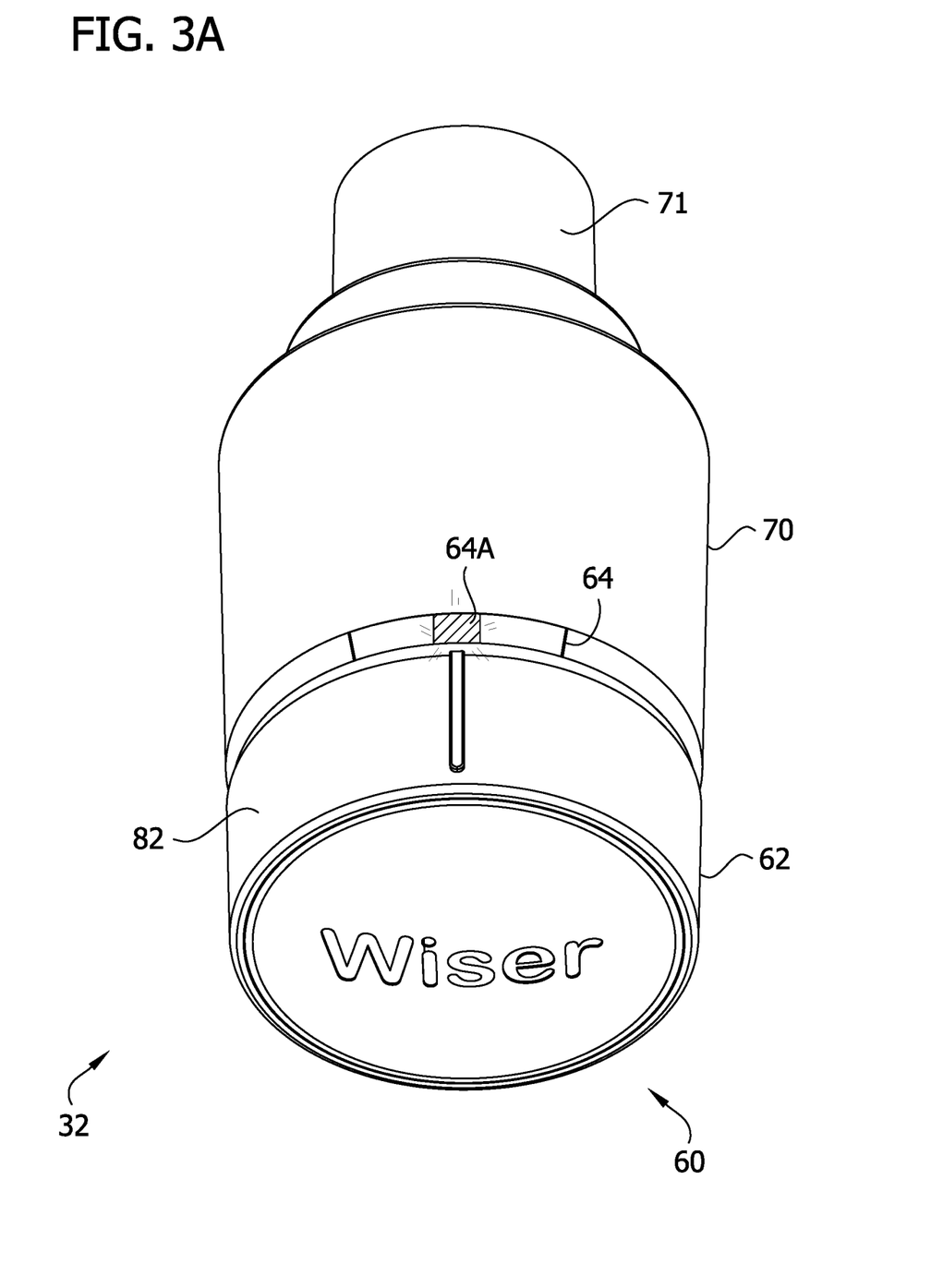
FIG. 3A is another perspective of the electronic thermostatic radiator valve illustrating a knob thereof in a home position and a home indicator light thereof illuminated.
Figure 3B:
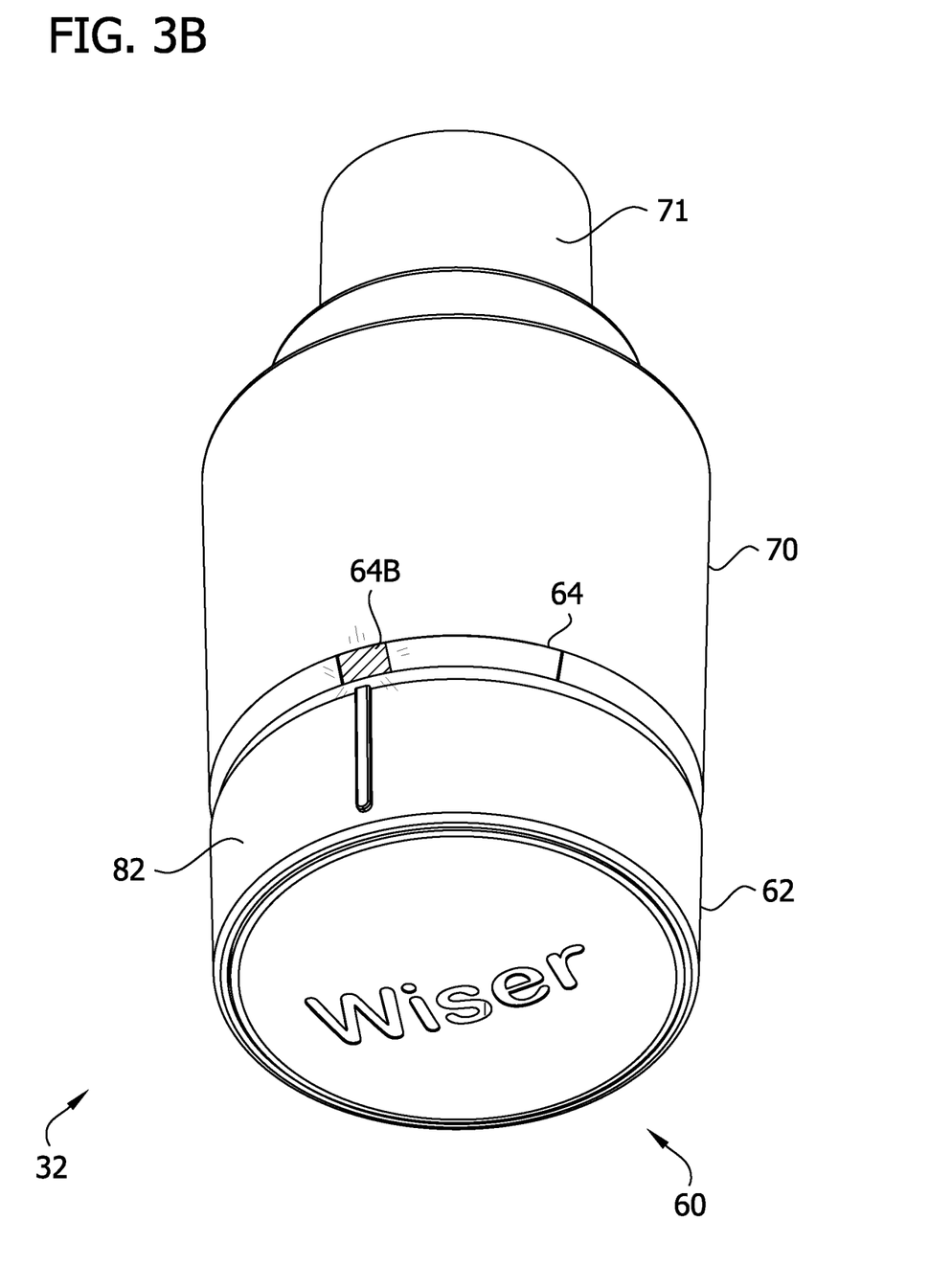
FIG. 3B is a perspective similar to FIG. 3A illustrating the knob of the electronic thermostatic radiator valve in a set point decrease position and a set point decrease indicator light of the electronic thermostatic radiator valve illuminated.
Figure 3C:
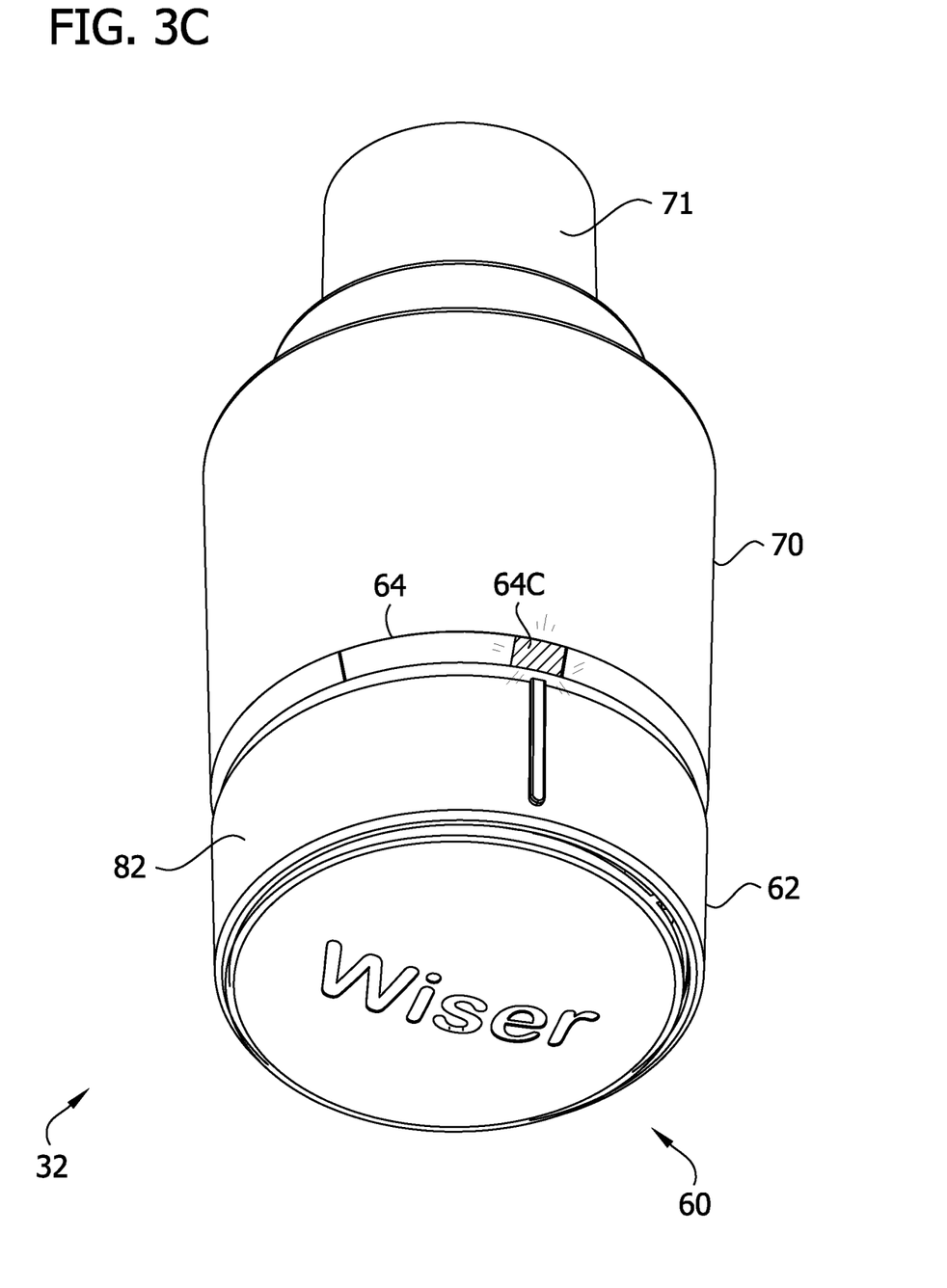
FIG. 3C is a perspective similar to FIG. 3A illustrating the knob of the electronic thermostatic radiator valve in a set point increase position and a set point increase indicator light of the electronic thermostatic radiator valve illuminated.

The user input mechanism 62 of the user interface 60 is operatively mounted on the base 70. In general, the user input mechanism 62 is configured to receive user inputs whereby the user interface 60 transmits a set point temperature adjustment signal to the thermostat 38 that changes the set point temperature to be equal to the environmental temperature detected by the temperature sensor 38A, plus or minus a predetermined amount (e.g., the thermostat increases or decreases the set point temperature by 2° C. from the detected environmental temperature). In the illustrated embodiment, the user interface 82 includes a knob 82 (broadly, a user input member) that is mounted on the base 70 for movement with respect to the base. The illustrated knob 82 is rotatably mounted at the free end of the base 70 opposite the end fitting 71. The knob 82 is configured to be rotated by a user with respect to the base 70 through a range of motion. As shown in FIGS. 3A-3C, the range of motion of the knob 82 includes a home position (FIG. 3A), a set point decrease position (FIG. 3B), and a set point increase position (FIG. 3C). In the illustrated embodiment, the set point decrease position (FIG. 3B) is adjacent one end of the range of motion, the set point increase position (FIG. 3C) is adjacent the opposite end of the range of motion, and the home position (FIG. 3A) is about midway between the set point decrease position and the set point increase position.

Referring to FIG. 4, a circuit board 84 is mounted on the base 70 in operative alignment with the knob 82. Suitably, the circuit board 84 includes first and second momentary contact switches (not shown) that are configured to be activated by movement of the knob 82 to a respective one of the set point decrease position (FIG. 3B) and the set point increase position (FIG. 3C). When the knob 82 is moved from the home position (FIG. 3A) to either of the set point decrease position (FIG. 3B) or the set point increase position (FIG. 3C), it activates the respective momentary contact switch on the circuit board 84 to generate a respective set point decrease signal or set point increase signal. The thermostat 38 is operatively connected to the circuit board 84 to receive the signals from the momentary contact switches when they are activated. For example, in one or more embodiments, the thermostat 38 is mounted on the circuit board 84 and the circuit board includes electrical traces that connect the thermostat to the momentary contact switches. In response to the set point decrease signal, thermostat 38 adjusts the set point temperature to be equal to the detected environmental temperature, minus the predetermined adjustment amount (e.g., 2° C.). Conversely, in response to the set point increase signal, thermostat 38 adjusts the set point temperature to be equal to the detected environmental temperature, plus the predetermined adjustment amount (e.g., 2° C.). In this manner, the user is permitted to make relative adjustments to the temperature of the particular EZ.

Referring still to FIG. 4, the illustrated user input mechanism 62 further includes a return mechanism that is operatively connected to the base 70 and the knob 82 to automatically return the knob to the home position (FIG. 3A) after it is moved to the set point decrease position (FIG. 3B) or the set point increase position (FIG. 3C). In the illustrated embodiment, the return mechanism includes a resiliently deformable hub member 88 that is mounted on the base. The hub member includes a central portion 88A and a plurality of lugs 88B that extend radially outward from the central portion. A screw 89 fastens the outer end portion of each lug to the base 70 to fix the outer end portion of the respective lug in place with respect to the base. The central portion 88A of the hub member 88 is shaped for interlocking engagement with the knob 82. For example, the illustrated hub member 88 defines an axially extending aperture 90 that is keyed to a stem portion 92 of the knob 82 and a plurality of locking prongs 94 that extend axially through a hole in the circuit board 84 into corresponding receptacles (not shown) in the knob 82. The interlocking features of the knob 82 and central portion 88B of the hub member 88 inhibit relative rotation between the central portion of the hub member and the knob. Thus, when the knob is rotated from the home position (FIG. 3A) to one of the set point decrease position (FIG. 3B) or set point increase position (FIG. 3C), the central portion of the hub member rotates with the knob with respect to the base 70. But since the lugs 88B of the hub member 88 are fixed in place with respect to the base 70, they are deformed to accommodate rotation of the central portion 88A. Since the lugs 88B are made of a resiliently deformable material, after the rotational force that deforms the lugs is released, they return to their non-deformed shapes, which likewise returns the central portion 88A and the knob 82 to the home position. Although the illustrated embodiment uses the resilient hub member 88 to automatically return the knob 82 to the home position (FIG. 3A), other embodiments can use other return mechanisms without departing from the scope of the invention.

Referring to FIGS. 2-3C, in addition to the user input mechanism 62, the illustrated user interface 60 also includes the indicator 64, which is configured to provide an indication of adjustments that are made to the set point temperature while concealing the value of the set point temperature from the user (i.e., the indicator does not display the value of the set point temperature to the user). In the illustrated embodiment, the indicator 64 comprises an indicator light panel. Other indicators, such as an audio indicator, may also be used in other embodiments. As shown in FIG. 3A, the indicator light panel 64 includes a home light 64A that is generally circumferentially aligned with the home position of the knob 82 about the axis of rotation of the knob (e.g., the home light 64A is circumferentially aligned with a radially protruding indicator spline of the knob 82 in the illustrated embodiment). As shown in FIG. 3B, the indicator light panel 64 also includes a set point decrease light 64B that is generally circumferentially aligned with the set point decrease position of the knob 82. As shown in FIG. 3C, the indicator light panel 64 further includes a set point increase light 64C that is generally circumferentially aligned with the set point increase position of the knob 82. Suitably, each of the lights 64A-64C comprises a light emitting diode configured to emit one or more colors of light when illuminated. In one or more embodiments, the set point decrease light 64B is configured to emit at least blue light, which is commonly understood to represent cool temperatures; and the set point increase light 64C is configured to emit at least red light, which is commonly understood to represent warm temperatures. Although the illustrated embodiment uses a three-light indicator panel 64, other types of indicators can also be used in other embodiments. Suitably, however, certain embodiments will conceal (i.e., refrain from displaying) the set point temperature and the detected temperature to the user in order to conserve power and limit the information provided to the user to that which is necessary to use the thermostat 38 to maintain a comfortable environmental temperature.

As shown in FIG. 2, the indicator light panel 64 is operatively connected to an indicator controller 102 that is configured to selectively illuminate the indicator lights 64A-64C. Suitably, the indicator controller 102 is configured to illuminate the set point decrease indicator light 64B when the set point temperature is less than the environmental temperature detected by the temperature sensor 38A. For example, after the user twists the knob 82 to the set point decrease position (FIG. 3B) and the set point temperature is reduced from the detected environmental temperature by the predetermined adjustment amount, the set point temperature will be less than the environmental temperature and the indicator controller 102 will illuminate the set point decrease indicator light 64B. Likewise, after the user twists the knob 82 to the set point increase position (FIG. 3C) and the set point temperature is increased from the detected environmental temperature by the predetermined adjustment amount, the set point temperature will be greater than the environmental temperature and the indicator controller 102 will illuminate the set point increase indicator light 64C.

Once the detected environmental temperature reaches or approaches the new set point temperature (e.g., the detected environmental temperature differs from the set point temperature by no more than the absolute value of a predetermined temperature difference), the indicator controller 102 deactivates the respective indicator light 64A, 64B. The set point decrease and increase indicator lights 64B, 64C can also be activated and deactivated based on other control logic in other embodiments. For example, in certain embodiments, the indicator controller 102 is connected to the momentary contact switches of the circuit board 84 to determine when an adjustment is made and to selectively illuminate the respective indicator light 64B, 64C after the adjustment is made for a predetermined amount of time that generally corresponds with the amount of time required to adjust the temperature of the environmental zone.

As can now be appreciated, the indicator controller 102 selectively illuminates the lights 64B, 64C to provide the user an indication that the heating system 10 is currently adjusting the temperature of the environmental zone EZ. When neither of the indicator lights 64B, 64C is illuminated, the indicator light panel 64 provides an indication that no adjustments are presently being made. Together, these indications help the user distinguish between when a set point adjustment using the knob 82 might help achieve a comfortable environmental temperature (i.e., when the indicator lights 64B, 64C are turned off) and when an additional set point adjustment is unnecessary because the system 10 is already making an adjustment (i.e., when one of the indicator lights 64B, 64C is turned on). In typical use, the user will not require any additional information to determine whether an additional set point adjustment would improve the environmental temperature of the zone EZ. Thus, the indicator lights 64B, 64C are selectively illuminated without identifying the value of the set point temperature or detected environmental temperature, which is superfluous information that can create unnecessary confusion.

In one or more embodiments, the indicator light panel 64 is also used to provide additional indications to the user. For example, the indicator controller 102 may be configured to selectively illuminate the home light 64A and/or one or more of the other lights 64B, 64C in one or more colors to provide status indications during system setup and/or to provide an indication of a system error. Still other uses of the indicator light panel 64 are also possible without departing from the scope of the invention.

Referring to FIG. 2, the illustrated user interface 60 further includes a set point lockout controller 110. The set point lockout controller 110 is operatively connected to the thermostat 38 to determine when a temperature adjustment is being made. For example, in certain embodiments, the lockout controller 110 is configured to receive the temperature signal from the temperature sensor 38A of the thermostat and use the temperature signal to determine when the temperature of the environmental zone EZ differs from the set point temperature by more than a predetermined maximum temperature offset (e.g., when the detected environmental temperature differs from the set point temperature by a maximum offset of at least about 2° C.). When the lockout controller 110 determines that the set point temperature exceeds the detected temperature by more than the maximum offset, it is configured to prevent a further increase to the set point temperature in response to movement of the knob 82 (i.e., the lockout controller 110 locks the user out from making a further increase to the temperature set point). Likewise, when the lockout controller 110 determines that the detected temperature exceeds the set point temperature by more than the maximum offset, it is configured to prevent a further decrease to the set point temperature in response to movement of the knob 82. When the difference between the set point temperature and the detected temperature is less than the predetermined offset, the set point lockout controller 110 is configured to permit adjustment of the set point temperature using the knob 82. It can therefore be seen that the set point lockout controller prevents the lay user who is attempting to adjust the heating system 10 from within an environmental zone from making set point temperature adjustments that are likely to be unnecessary or to result in an excessive change of temperature in the environmental zone EZ. Moreover, because both the set point adjustment and the lockout controls use the detected environmental temperature as a reference point (i.e., a set point adjustment using the knob 82 generates a new set point temperature that is equal to the detected temperature, plus or minus a predetermined amount; and lockout occurs when the detected temperature already differs from the detected temperature by at least the predetermined maximum offset), even when the lockout controller 110 prevents the user from further adjusting the set point temperature, the heating system 10 will still be functioning to adjust the environmental temperature in the zone EZ as the user intended. The lockout controller 110 merely prevents the user from over-adjusting the temperature of the zone EZ.

A method of using the heating system 10 to control the temperatures in the environmental zones EZ will now be briefly described. When the electronic thermostatic radiator valves 32 are initially installed in the building B, the thermostats 38 operate at default set point temperatures. To select a new set point temperature value, a user can access the mobile device 50 and provide a user input selecting the desired temperature value for the set point of each environmental zone EZ. During ordinary use, if a user determines that the environmental temperature in any environmental zone is too hot or too cold, the user can make an adjustment to the set point temperature using the user interface 60. If the temperature in the environmental zone EZ is too hot, the user rotates the knob 82 from the home position (FIG. 3A) to the set point decrease position (FIG. 3B); or if the temperature in the environmental zone EZ is too cold, the user rotates the knob from the home position to the set point increase position (FIG. 3C). In each case, the thermostat controller 38B automatically changes the set point temperature to the detected temperature, plus or minus the predetermined adjustment amount (e.g., 2° F.). Depending on the system configuration, the decrease or increase in the set point temperature can either be a permanent change to the set point temperature or a temporary change (i.e., the controller 20 can automatically return the set point temperature to its previous or default value after a predetermined amount of time has passed following the set point adjustment). After the user adjusts the set point temperature, the indicator controller 102 automatically illuminates the respective indicator light 64A, 64B until the detected environmental temperature approaches the new set point temperature. And until the difference between the new set point temperature and the detected environmental temperature is less than the maximum temperature offset, the set point lockout controller 110 prevents the user from making a further adjustment to the set point temperature using the user interface 60.

As can be seen, the illustrated thermostatic user interface 60 provides intuitive controls for adjusting the set point temperature of an environmental control system in an efficient and effective manner. The user interface 60 provides a simple indicator panel that limits the amount of information provided to the user to only that which is necessary to allow the user to maintain the environmental zone at a comfortable temperature. The lockout controller 110 prevents the user from overcorrecting when the user finds the environment too hot or too cold, and the input mechanism 82 provides intuitive controls that mimic the well understood control scheme of a domestic water knob.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A user interface for adjusting a set point temperature of a thermostat configured to thermostatically control a radiator valve to selectively convey heating fluid to a radiator to adjust an environmental temperature toward the set point, the user interface comprising:

a base;

a user input member mounted on the base for movement with respect to the base through a range of motion including a home position, a set point decrease position, and a set point increase position, the user input member being operatively connected to the thermostat to decrease the set point temperature when the user input member is moved from the home position to the set point decrease position and to increase the set point temperature when the user input member is moved from the home position to the set point increase position; and a return mechanism operatively connected to the base and the user input member to automatically return the user input member to the home position after it is moved to either of the set point decrease position and the set point increase position and released, wherein the return mechanism comprises resiliently deformable hub member configured to resiliently deform when the user input member is moved from the home position toward either of the set point decrease position and the set point increase position and to rebound to return the user input member to the home position when the user input member is released.

2. The user interface as set forth in claim 1 wherein the hub member comprises a central portion linked to the user input member for movement with the user input member with respect to the base and a plurality of lugs extending radially from the central portion having outer end portions that are fixed to the base.

3. The user interface as set forth in claim 2 wherein the plurality of lugs are configured to resiliently deform when the user input member is moved away from the home position.

4. The user interface as set forth in claim 2 wherein the user input member comprises a knob mounted on the base for rotation with respect to the base about an axis of the knob, the knob and the central portion of the hub comprising complementary interlocking features that interlockingly engage one another to inhibit relative rotation between the knob and the central portion of the hub.

5. The user interface as set forth in claim 4 wherein the knob comprises a stem extending along the axis and the central portion of the hub defines an axially extending aperture for lockingly receiving the stem.

6. The user interface as set forth in claim 4 wherein the knob defines a plurality of receptacles and the central portion of the hub comprises a plurality of prongs shaped and arranged for being lockingly received in the receptacles.

* * * * *